US006504678B1

(12) United States Patent
Kamijima

(10) Patent No.: US 6,504,678 B1
(45) Date of Patent: Jan. 7, 2003

(54) THIN-FILM MAGNETIC HEAD HAVING A CAVITY FORMED BETWEEN THROAT-HEIGHT-DEFINING MAGNETIC LAYER AND GAP LAYER

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 151 days.

(21) Appl. No.: 09/711,102

(22) Filed: Nov. 14, 2000

(30) Foreign Application Priority Data

Nov. 29, 1999 (JP) ............................................. 11-338054

(51) Int. Cl.⁷ ............................................. G11B 5/147
(52) U.S. Cl. ........................................................ 360/126
(58) Field of Search .................................. 360/126, 317

(56) References Cited

U.S. PATENT DOCUMENTS

| 5,438,747 A | | 8/1995 | Krounbi et al. | |
|---|---|---|---|---|
| 5,652,687 A | * | 7/1997 | Chen | 360/126 |
| 6,104,576 A | * | 8/2000 | Santini | 360/126 |
| 6,130,805 A | * | 10/2000 | Sasaki | 360/126 |
| 6,134,080 A | * | 10/2000 | Chang | 360/126 |
| 6,156,375 A | * | 12/2000 | Hu | 360/126 |

FOREIGN PATENT DOCUMENTS

| JP | A 6-68424 | 3/1994 |
|---|---|---|
| JP | A 6-309621 | 11/1994 |
| JP | A 6-314413 | 11/1994 |
| JP | A 7-262519 | 10/1995 |

\* cited by examiner

Primary Examiner—A. J. Heinz
(74) Attorney, Agent, or Firm—Oliff & Berridge, PLC

(57) ABSTRACT

A recording head of a thin-film magnetic head incorporates a bottom pole layer and a top pole layer that include pole portions, and a recording gap layer placed between the pole portions. The recording head further incorporates a thin-film coil placed between the bottom and top pole layers, the coil being insulated from the pole layers. The top pole layer is formed on the flat top surface of the recording gap layer, and formed such that a portion thereof forms a cavity with the recording gap layer. The throat height is defined by an end of the cavity closer to the air bearing surface.

6 Claims, 12 Drawing Sheets

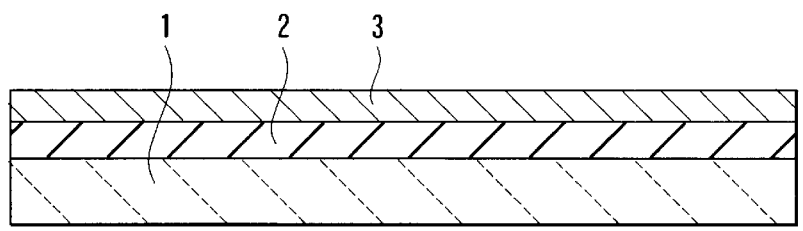
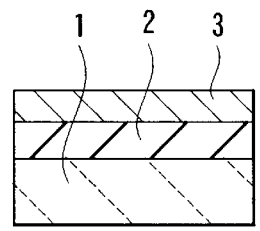
FIG. 3A          FIG. 3B
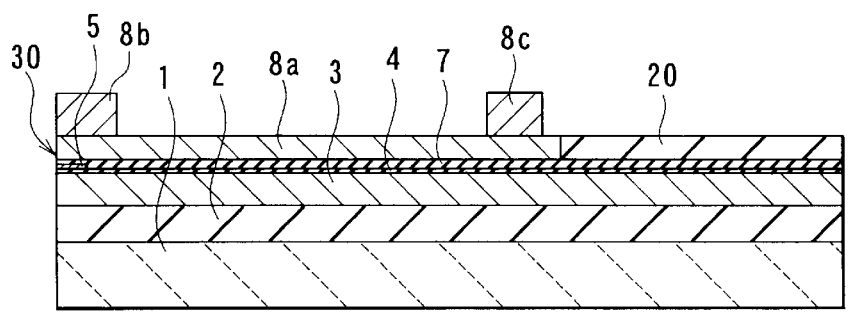
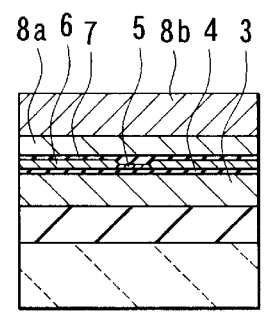
FIG. 4A          FIG. 4B

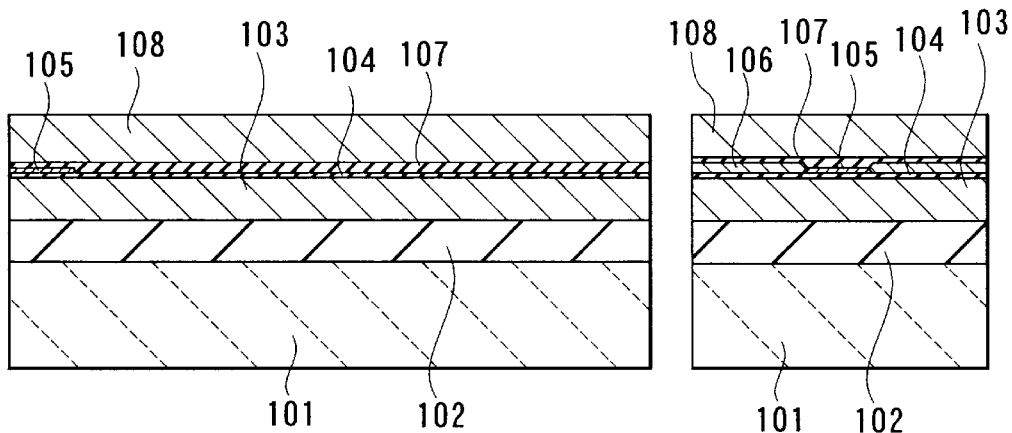
FIG. 12A
RELATED ART
FIG. 12B
RELATED ART
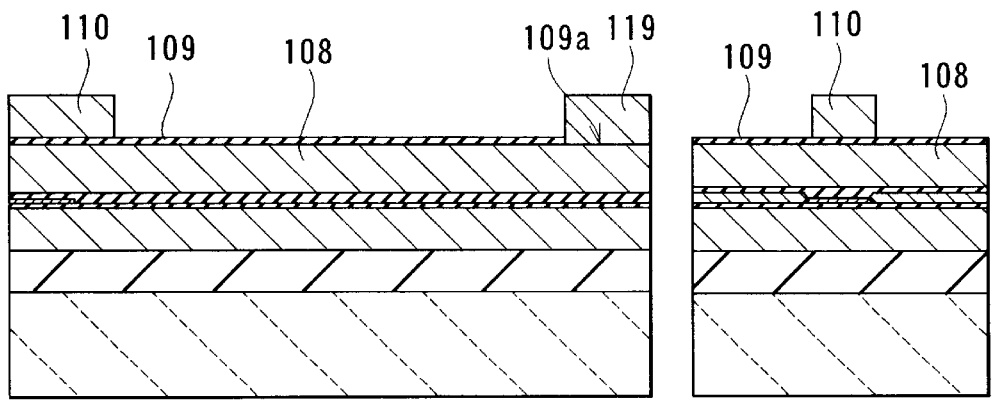
FIG. 13A
RELATED ART
FIG. 13B
RELATED ART

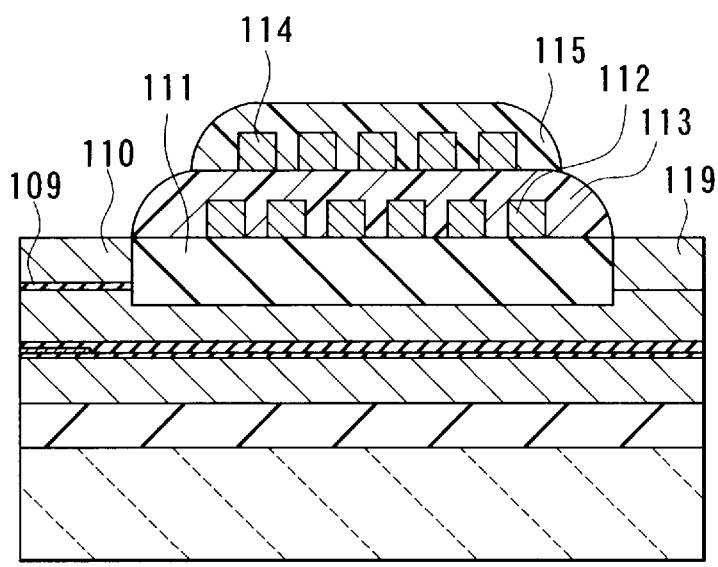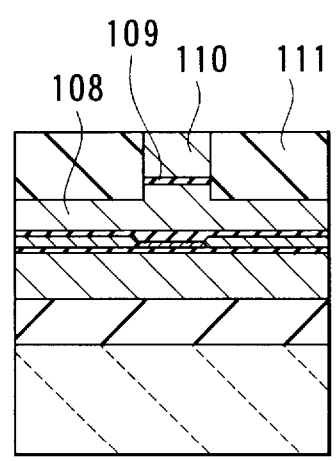
FIG. 14A
RELATED ART
FIG. 14B
RELATED ART

THIN-FILM MAGNETIC HEAD HAVING A CAVITY FORMED BETWEEN THROAT-HEIGHT-DEFINING MAGNETIC LAYER AND GAP LAYER

BACKGROUND OF THE INVENTION

1. Field of the Invention

The present invention relates to a thin-film magnetic head having at least an induction-type electromagnetic transducer and a method of manufacturing such a thin-film magnetic head.

2. Description of the Related Art

Performance improvements in thin-film magnetic heads have been sought as a real recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface (medium facing surface) is reduced down to microns or the order of submicron. Semiconductor process techniques are utilized to implement such a structure.

Reference is now made to FIG. 12A to FIG. 15A and FIG. 12B to FIG. 15B to describe an example of a method of manufacturing a composite thin-film magnetic head as an example of a related-art method of manufacturing a thin-film magnetic head. FIG. 12A to FIG. 15A are cross sections each orthogonal to an air bearing surface of the thin-film magnetic head. FIG. 12B to FIG. 15B are cross sections of a pole portion of the head each parallel to the air bearing surface.

In the manufacturing method, as shown in FIG. 12A and FIG. 12B, an insulating layer 102 made of alumina ($Al_2O_3$), for example, having a thickness of about 5 to 10 μm is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 μm is formed. The bottom pole layer 108 is made of a magnetic material and used for both a reproducing head and a recording head.

Next, as shown in FIG. 13A and FIG. 13B, on the bottom pole layer 108, a recording gap layer 109 made of an insulating film such as an alumina film whose thickness is 0.2 μm is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 μm is formed for the recording head. At the same time, a magnetic layer 119 made of a magnetic material is formed for making the magnetic path in the contact hole 109a for making the magnetic path.

Next, as shown in FIG. 14A and FIG. 14B, the recording gap layer 109 and the bottom pole layer 108 are etched through ion milling, using the top pole tip 110 as a mask. As shown in FIG. 14B, the structure is called a trim structure wherein the sidewalls of the top pole (the top pole tip 110), the recording gap layer 109, and a part of the bottom pole layer 108 are formed vertically in a self-aligned manner.

Next, an insulating layer 111 made of an alumina film, for example, and having a thickness of about 3 μm is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 15A and FIG. 15B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider including the foregoing layers is performed to form the air bearing surface 118 of the thin-film magnetic head including the recording head and the reproducing head. The thin-film magnetic head is thus completed.

FIG. 16 is a top view of the thin-film magnetic head shown in FIG. 15A and FIG. 15B. The overcoat layer 117 and the other insulating layers and insulating films are omitted in FIG. 16.

In FIG. 15A, 'TH' indicates the throat height and 'MR-H' indicates the MR height. The throat height is the length (height) of portions of the magnetic pole layers facing each other with the recording gap layer in between, between the air-bearing-surface-side end and the other end. The MR height is the length (height) between the air-bearing-surface-side end of the MR element and the other end. In FIG. 15B, 'P2W' indicates the pole width, that is, the recording track width. In addition to the throat height, the MR height and so on, the apex angle as indicated with θ in FIG. 15A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 15A and FIG. 15B.

To achieve high a real recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer of small dimensions on the apex.

As disclosed in Published Unexamined Japanese Patent Application Heisei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a resist trench pattern having spacing of the submicron order through the use of a photoresist film. Therefore, it is required to form a fine trench pattern of the submicron order on top of the apex through the use of a photoresist film having a thickness of 8 to 10 μm or more. However, it is extremely difficult to form a photoresist pattern having such a thickness with small spacing, due to restrictions in the manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

In the sloped region of the apex, in particular, rays of light used for exposure that are reflected off the base electrode film include not only rays in the vertical direction but also those in the slanting or horizontal direction reflected off the slope of the apex. The photoresist is thus exposed to those rays of light and the photoresist pattern more greatly goes out of shape.

As disclosed in Published Unexamined Japanese Patent Application Heisei 6-68424 (1994), Published Unexamined Japanese Patent Application Heisei 6-309621 (1994) and Published Unexamined Japanese Patent Application Heisei 6-314413 (1994), for example, a thin-film magnetic head in which the top pole layer is formed on a flat surface has been proposed. Such a head solves the problem found in cases in which the top pole layer is formed on the apex.

The position of an end of the pole portion opposite to the air bearing surface is hereinafter called a zero throat height position. In the thin-film magnetic head disclosed in Published Unexamined Japanese Patent Application Heisei 6-68424 (1994), the zero throat height position is defined by an end of the top pole. In the thin-film magnetic head disclosed in Published Unexamined Japanese Patent Application Heisei 6-309621 (1994), the zero throat height position is defined by an end of the bottom pole. In the thin-film magnetic head disclosed in Published Unexamined Japanese Patent Application Heisei 6-314413 (1994), the zero throat height position is defined by an end of the top pole and an end of the bottom pole. In any of these heads the end that defines the zero throat height position is a surface orthogonal to the recording gap layer. Therefore, in any of these heads the space between the bottom and top pole layers from the air bearing surface to the zero throat height position has a specific length equal to the thickness of the recording gap layer. This space abruptly increases from the zero throat height position toward the side opposite to the air bearing surface.

In such a structure where the space between the bottom and top pole layers abruptly increases near the zero throat height position, however, the flow of magnetic flux passing through the pole layers toward the recording gap layer abruptly changes near the zero throat height position. As a result, the flux saturates near the zero throat height position, and the electromagnetic transducing characteristics of the thin-film magnetic head are reduced. The electromagnetic transducing characteristics are, to be specific, an overwrite property that is a parameter indicating one of characteristics when data is written over a region on a recording medium where data is already written, and a nonlinear transition shift (NLTS) characteristic, for example.

OBJECT AND SUMMARY OF THE INVENTION

It is an object of the invention to provide a thin-film magnetic head and a method of manufacturing the same for making the pole portions with accuracy and improving the electromagnetic transducing characteristics.

A thin-film magnetic head of the invention comprises: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The second magnetic layer includes a throat height defining layer touching a flat surface including the gap layer. The defining layer is formed such that a portion thereof forms a cavity with the recording gap layer, the cavity being located in a position at a specific distance from the medium facing surface. The throat height is defined by an end of the cavity closer to the medium facing surface.

A method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The method includes the steps of forming the first magnetic layer; forming the gap layer on the first magnetic layer; forming the second magnetic layer on the gap layer; and forming the thin-film coil. The step of forming the second magnetic layer includes the step of forming a throat height defining layer touching a flat surface including the gap layer. The defining layer is formed such that a portion thereof forms a cavity with the recording gap layer, the cavity being located in a position at a specific distance from the medium facing surface. The throat height is defined by an end of the cavity closer to the medium facing surface.

According to the thin-film magnetic head or the method of manufacturing the same of the invention, the throat height is defined by the end of the cavity formed in the portion between the throat height defining layer and the gap layer. The flow of flux passing through the throat height defining layer toward the gap layer smoothly changes near the end of the cavity closer to the medium facing surface, that is, near the zero throat height position.

According to the head or the method of the invention, the interface between the cavity and the throat height defining layer may form a curved surface.

According to the head or the method of the invention, the first magnetic layer may include: a first portion located to face the at least part of the thin-film coil; and a second portion including one of the pole portions and connected to a surface of the first portion facing toward the coil. In addition, the at least part of the coil may be located on a side of the second portion of the first magnetic layer. In this case, an insulating layer may be further provided. The insulating layer covers the at least part of the coil located on the side of the second portion of the first magnetic layer, and has a surface facing toward the gap layer, the surface being flattened together with a surface of the second portion of the first magnetic layer facing toward the gap layer. The end of the cavity closer to the medium facing surface may be located closer to the medium facing surface than an end of the second portion of the first magnetic layer opposite to the medium facing surface.

According to the head or the method of the invention, the throat height defining layer may include a portion for defining a track width.

According to the method of the invention, the step of forming the throat height defining layer may include the steps of forming a seed layer for plating on the gap layer; forming a positive resist layer on the seed layer; forming a frame for making the throat height defining layer by plating on the seed layer and forming a resist remaining portion in a region on the seed layer corresponding to the cavity, by exposing the resist layer through the use of a photomask and developing the resist layer, the photomask including: a light shielding region corresponding to the shape of the frame; a region corresponding to the cavity and located in a position corresponding to the cavity and intercepting at least part of rays of light used for exposure; and a region through which the rays of light pass, the region being located in a region except the light shielding region and the region corresponding to the cavity; forming the throat height defining layer by plating through the use of the frame; and forming the cavity by removing the frame and the resist remaining portion.

Other and further objects, features and advantages of the invention will appear more fully from the following description.

BRIEF DESCRIPTION OF THE DRAWINGS

FIG. 3A and FIG. 3B are cross sections for illustrating a step in a method of manufacturing the thin-film magnetic head of the embodiment.

FIG. 4A and FIG. 4B are cross sections for illustrating a step that follows FIG. 3A and FIG. 3B.

FIG. 12A and FIG. 12B are cross sections for illustrating a step in a method of manufacturing a thin-film magnetic head of related art.

FIG. 13A and FIG. 13B are cross sections for illustrating a step that follows FIG. 12A and FIG. 12B.

FIG. 14A and FIG. 14B are cross sections for illustrating a step that follows FIG. 13A and FIG. 13B.

DETAILED DESCRIPTION OF THE PREFERRED EMBODIMENT

Figure 1:
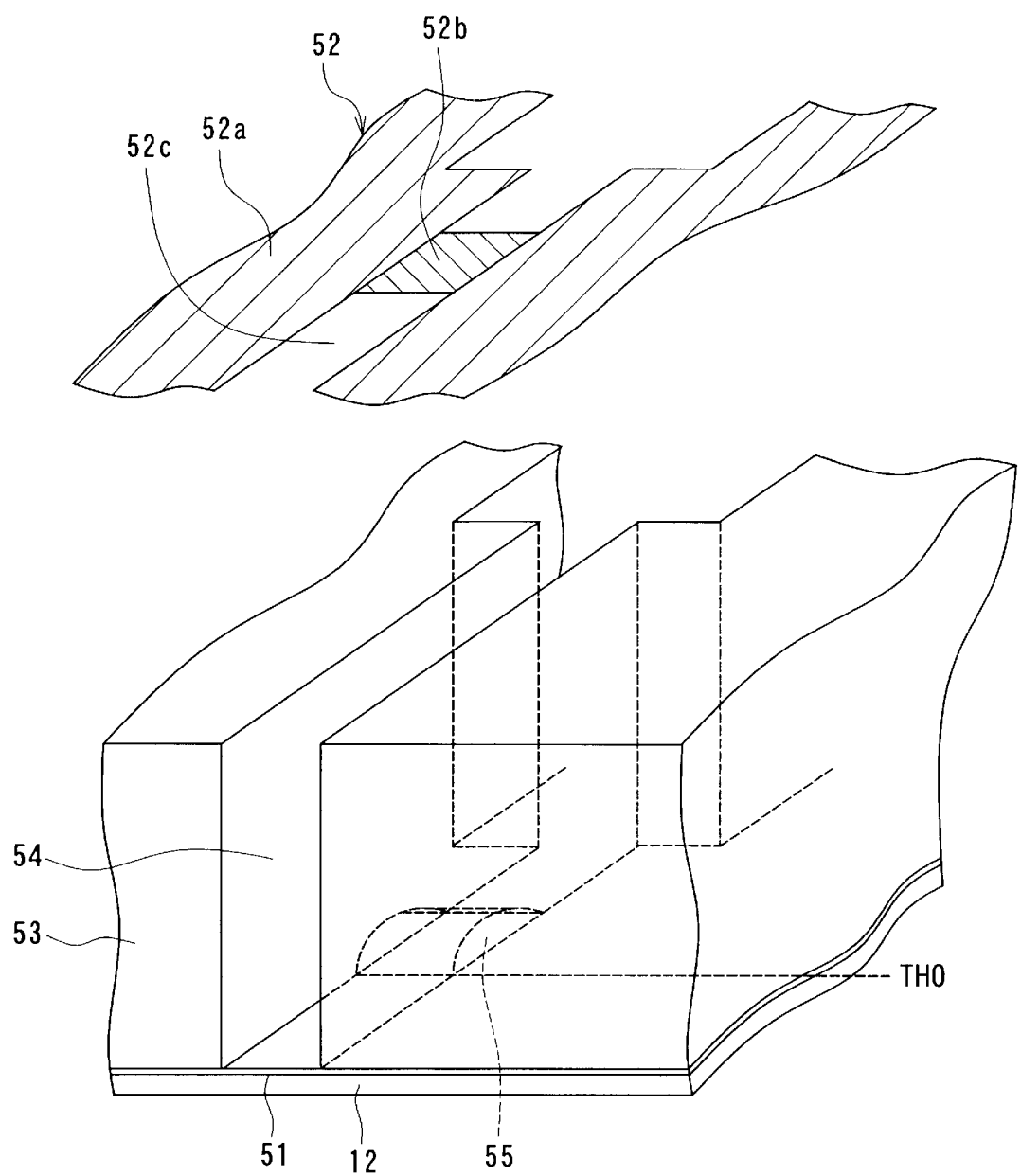
FIG. 1 is a perspective view for illustrating a method of forming a top pole layer and a cavity of a thin-film magnetic head of an embodiment of the invention.

A preferred embodiment of the invention will now be described in detail with reference to the accompanying drawings.

Reference is now made to FIG. 3A to FIG. 8A, FIG. 3B to FIG. 8B, and FIG. 9 to FIG. 11 to describe a thin-film magnetic head and a method of manufacturing the same of an embodiment of the invention. FIG. 3A to FIG. 8A are cross sections each orthogonal to an air bearing surface. FIG. 3B to FIG. 8B are cross sections of the pole portion each parallel to the air bearing surface.

In the manufacturing method, as shown in FIG. 3A and FIG. 3B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed, and the surface is 10 flattened.

Next, as shown in FIG. 4A and FIG. 4B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element.

Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina are fabricated through CVD, trimethyl aluminum ($Al(CH_3)_3$) and $H_2O$, for example, are used. Through the use of CVD, it is possible to make the thin and precise shield gap films 4 and 7 with few pinholes.

Next, on the top shield gap film 7, a first portion 8a of a top-shield-layer-cum-bottom-pole-layer (called a bottom pole layer in the following description) 8 is selectively formed. The first portion 8a has a thickness of about 1.0 to 1.5 µm, for example. The bottom pole layer 8 is made of a magnetic material and used for both reproducing head and recording head.

The bottom pole layer 8 is made up of the first portion 8a, and a second portion 8b and a third portion 8c described later. The first portion 8a is located to face at least a part of a thin-film coil described later.

Next, the second portion 8b and the third portion 8c each having a thickness of about 1.5 to 2.5 µm are formed on the first portion 8a. The second portion 8b includes the pole portion of the bottom pole layer 8, and is connected to a surface of the first portion 8a facing toward the thin-film coil (that is, the upper surface in the drawings). The third portion 8c is the portion for connecting the first portion 8a to a top pole layer described later.

The first portion 8a, the second portion 8b and the third portion 8c may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Figures 5A, 5B:
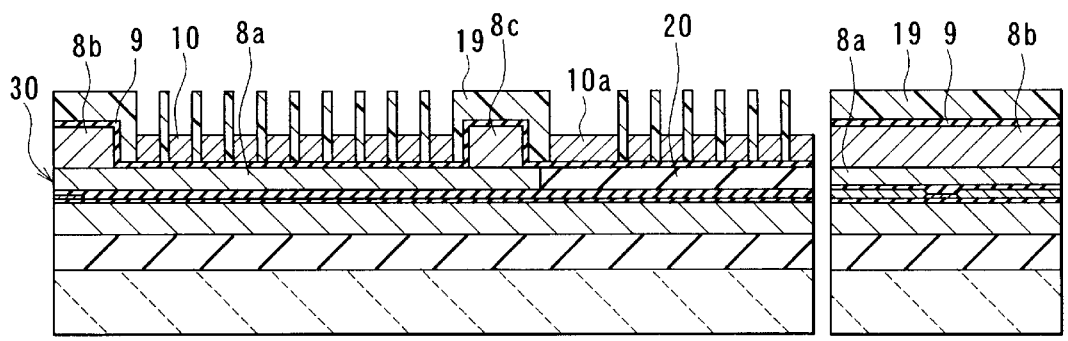
FIG. 5A and FIG. 5B are cross sections for illustrating a step that follows FIG. 4A and FIG. 4B.

Next, as shown in FIG. 5A and FIG. 5B, an insulating film 9 of alumina, for example, having a thickness of about 0.3 to 0.6 µm is formed over the entire surface.

Next, a photoresist is patterned through a photolithography process to form a frame 19 for making the thin-film coil through frame plating. Next, the thin-film coil 10 made of copper (Cu), for example, is formed by frame plating through the use of the frame 19. For example, the thickness of the coil 10 is about 1.0 to 2.0 µm and the pitch is 1.2 to 2.0 µm. The frame 19 is then removed. In the drawings numeral 10a indicates a portion for connecting the coil 10 to a conductive layer (lead) described later.

Figures 6A, 6B:
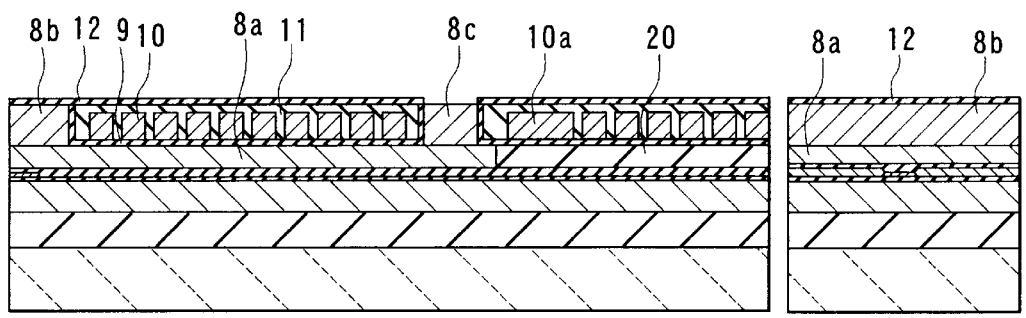
FIG. 6A and FIG. 6B are cross sections for illustrating a step that follows FIG. 5A and FIG. 5B.

Next, as shown in FIG. 6A and FIG. 6B, an insulating layer 11 of alumina, for example, having a thickness of about 3 to 4 µm is formed over the entire surface. The insulating layer 11 is then polished through CMP, for example, so that the second portion layer 8b and the third potion 8c of the bottom pole layer 8 are exposed, and the surface is flattened. Although the coil 10 is not exposed in FIG. 6A and FIG. 6B, the coil 10 may be exposed.

Next, a recording gap layer 12 made of an insulating material whose thickness is about 0.2 to 0.3 µm, for example, is formed on the second portion layer 8b and the third potion 8c of the bottom pole layer 8 that are exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the gap layer 12 made of alumina is fabricated through CVD, trimethyl aluminum ($Al(CH_3)_3$) and $H_2O$, for example, are used. Through the use of CVD, it is possible to make the thin and precise gap layer 12 with few pinholes.

Next, a portion of the recording gap layer 12 located on top of the third portion 8c is etched to form a contact hole for making the magnetic path. In addition, portions of the gap layer 12 and the insulating layer 11 located on top of the portion 10a of the coil 10 are etched to form another contact hole.

Figures 7A, 7B:
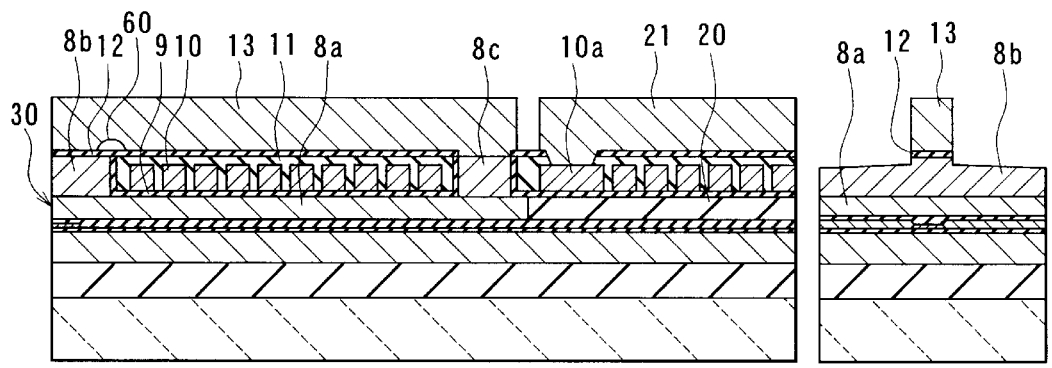
FIG. 7A and FIG. 7B are cross sections for illustrating a step that follows FIG. 6A and FIG. 6B.

Next, as shown in FIG. 7A and FIG. 7B, a top pole layer 13 having a thickness of about 2.0 to 3.0 µm is formed on a region of the recording gap layer 12 extending from the air bearing surface (medium facing surface) 30 to a portion on top of the third portion 8c of the bottom pole layer 8. At the same time, the conductive layer 21 having a thickness of about 2.0 to 3.0 µm is formed to be connected to the portion 10a of the thin-film coil 10. The top pole layer 13 is connected and magnetically coupled to the third portion 8c of the bottom pole layer 8 through the contact hole formed in the portion on top of the third portion 8c.

The top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. To improve the high frequency characteristics, the top pole layer 13 may be made of layers of inorganic insulating films and magnetic layers of Permalloy, for example.

In this embodiment the top pole layer 13 touches the flat top surface of the recording gap layer 12. A portion of the top pole layer 13 forms a cavity 60 with the gap layer 12, the cavity being located in a position at a specific distance from the air bearing surface 30. The throat height is defined by an end of the cavity 60 closer to the air bearing surface 30. The interface between the cavity 60 and the top pole layer 13 forms a curved surface. To be specific, the interface between the cavity 60 and the top pole layer 13 forms a part of a cylindrical surface formed around the axis parallel to the air bearing surface 30 and parallel to the recording gap layer 12.

The end of the cavity 60 closer to the air bearing surface 30 is located closer to the air bearing surface 30 than an end of the second portion 8b of the bottom pole layer 8 opposite to the air bearing surface 30. An end of the cavity 60 further from the air bearing surface 30 is located farther from the air bearing surface 30 than the end of the second portion 8b opposite to the air bearing surface 30. That is, the cavity 60 is located across the end of the second portion 8b opposite to the air bearing surface 30.

The method of making the top pole layer 13 and the cavity 60 will be described later in detail.

Figures 8A, 8B:
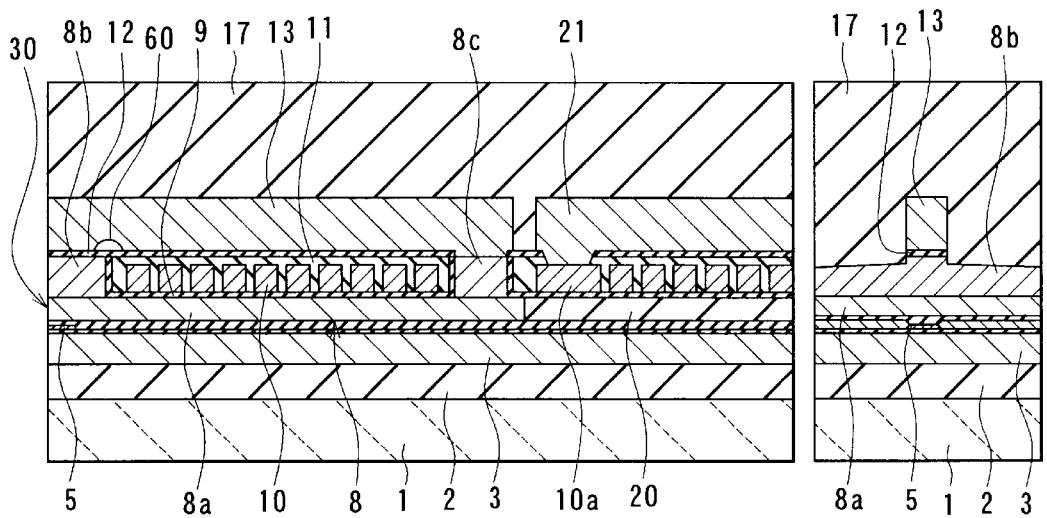
FIG. 8A and FIG. 8B are cross sections of the thin-film magnetic head of the embodiment.

Next, the recording gap layer 12 is selectively etched through dry etching, using the top pole layer 13 as a mask. This dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer 8 is selectively etched by about 0.3 to 0.6 µm, through argon ion milling, for example. A trim structure as shown in FIG. 7B is thus formed. The trim structure suppresses an increase in the effective track width due to expansion of a magnetic flux generated during writing in a narrow track. Next, as shown in FIG. 8A and FIG. 8B, an overcoat layer 17 of alumina, for example, having a thickness of 20 to 40 µm is formed over the entire surface. The surface of the overcoat layer 17 is then flattened and pads (not shown) for electrodes are formed on the overcoat layer 17. Finally, lapping of the slider including the foregoing layers is performed to form the air bearing surfaces 30 of the thin-film magnetic head including the recording head and the reproducing head. The thin-film magnetic head of the embodiment is thus completed.

In this embodiment the bottom pole layer 8 made up of the first portion 8a, the second portion 8b and the third portion 8c corresponds to the first magnetic layer of the invention. The top pole layer 13 corresponds to the second magnetic layer of the invention. In this embodiment the top pole layer 13 is made up of a single layer and corresponds to the throat height defining layer of the invention, too.

Figure 9:
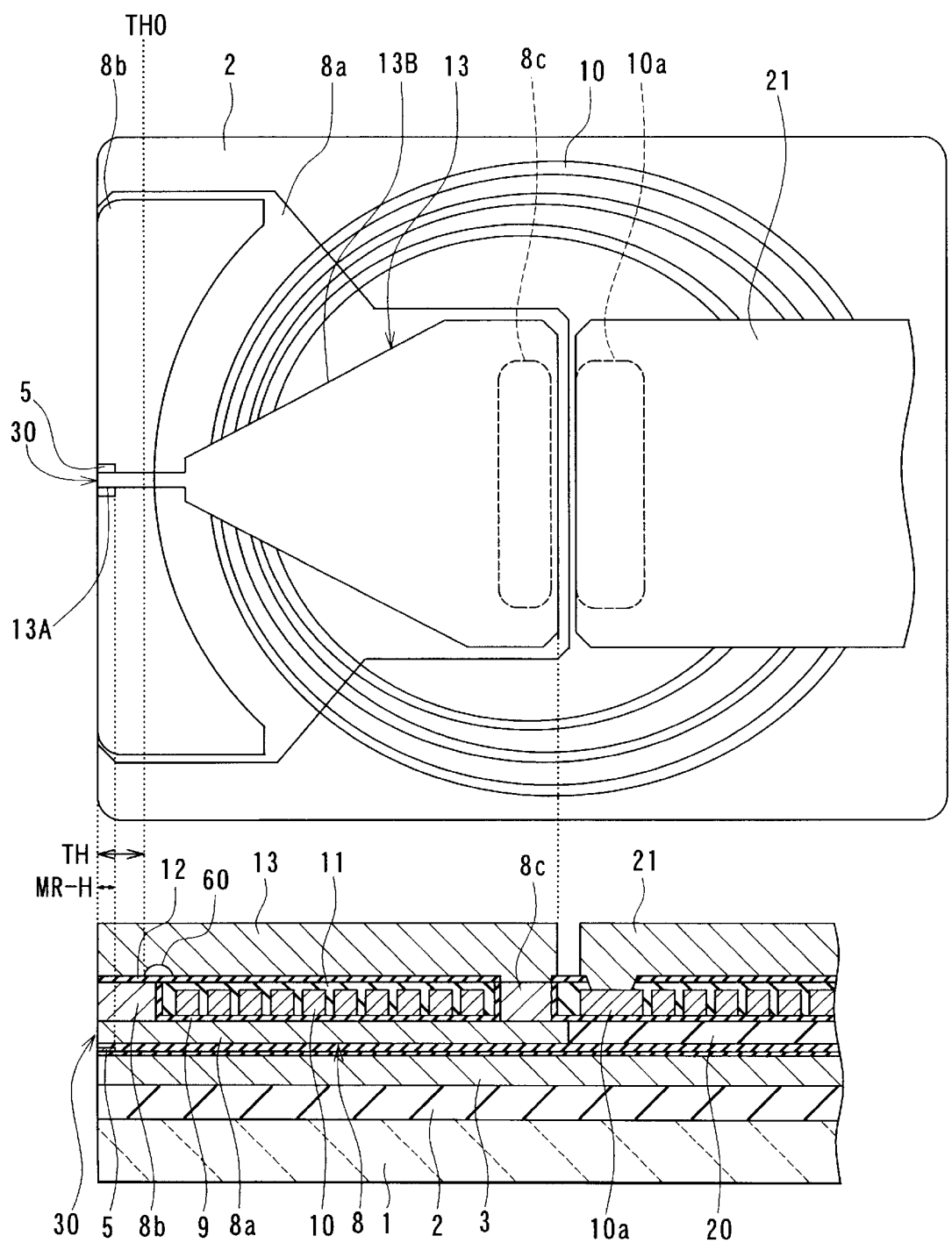
FIG. 9 illustrates the relationship between a top view of the main part of the thin-film magnetic head of the embodiment and a cross-sectional view thereof.

FIG. 9 illustrates the relationship between a top view of the main part of the thin-film magnetic head of the embodiment (the upper view of FIG. 9) and a cross-sectional view thereof (the lower view of FIG. 9). In the top view of FIG. 9 the overcoat layer 17 and the other insulating layer and films are omitted. In FIG. 9 'TH' indicates the throat height, 'THO' indicates the zero throat height position, and 'MR-H' indicates the MR height.

As shown in FIG. 9, the top pole layer 13 includes a first portion 13A and a second portion 13B, the first portion 13A being closer to the air bearing surface 30. The first portion 13A has a width equal to the recording track width. The second portion 13B has a width greater than that of the first portion 13A. The width of the second portion 13B gradually decreases as the distance from the air bearing surface 30 decreases. The top pole layer 13 has edges parallel to the air bearing surface 30, the edges connecting edges of the first portion 13A located at ends of the width thereof to edges of the second portion 13B located at ends of the width thereof. In the top pole layer 13 the interface between the first portion 13A and the second portion 13B is located farther from the air bearing surface 30 than zero throat height position THO.

Figure 10:
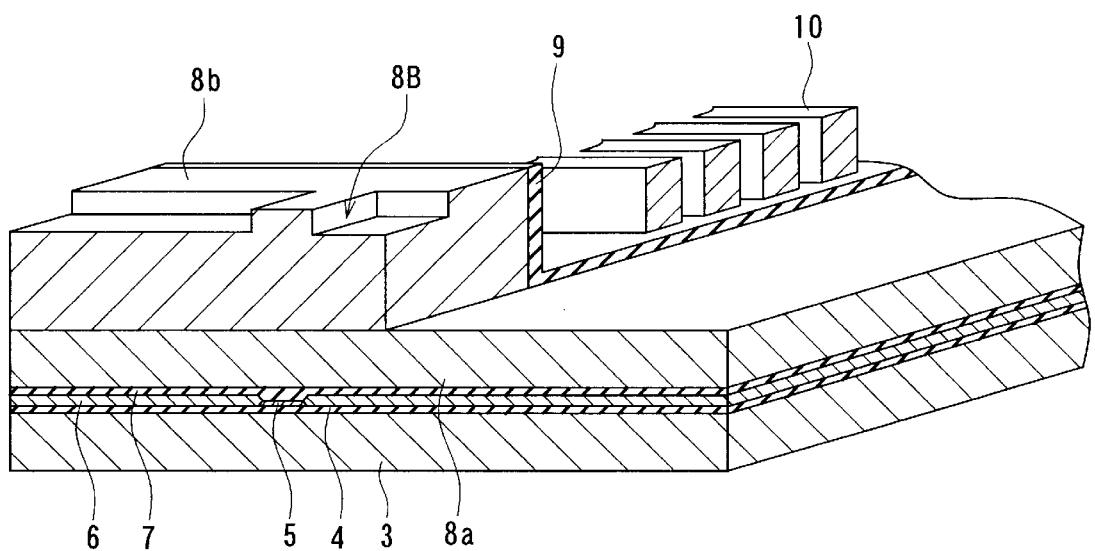
FIG. 10 is a partially-cutaway perspective view of the main part of the thin-film magnetic head of the embodiment.

FIG. 10 is a partially-cutaway perspective view of the part of the thin-film magnetic head of the embodiment, the part ranging from the bottom shield layer 3 to the second portion 8b of the bottom pole layer 8, the insulating film 9 and the thin-film coil 10. In FIG. 10 numeral 8B indicates the portion of the second portion 8b etched to make the trim structure.

Figure 11:
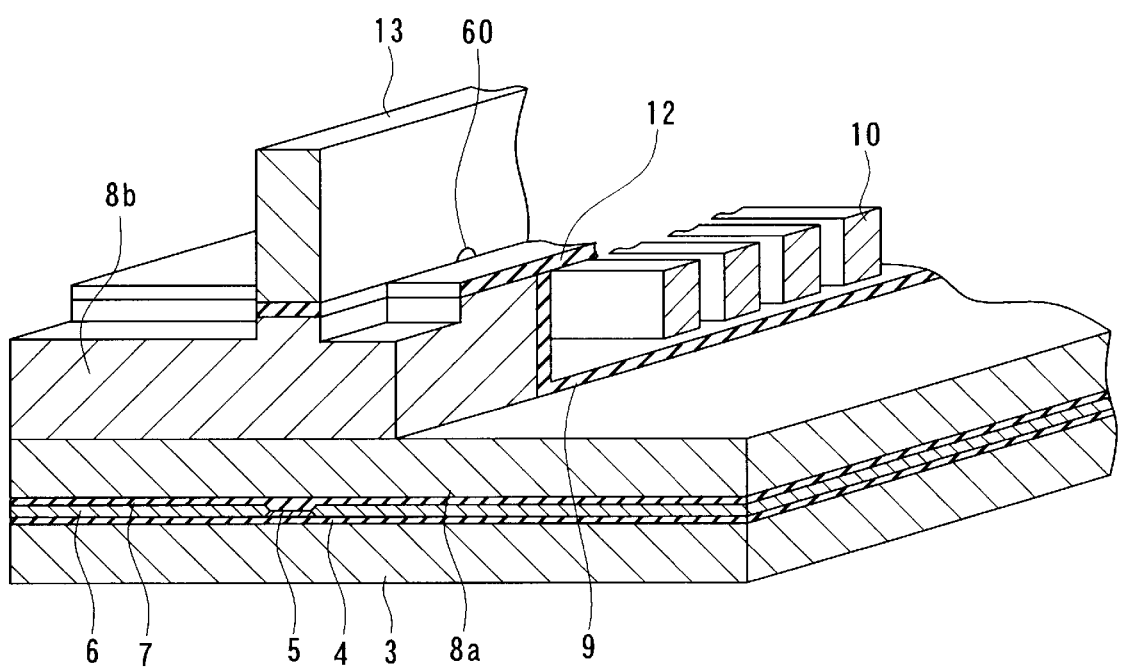
FIG. 11 is a partially-cutaway perspective view of the main part of the thin-film magnetic head of the embodiment.
Figures 15A, 15B:
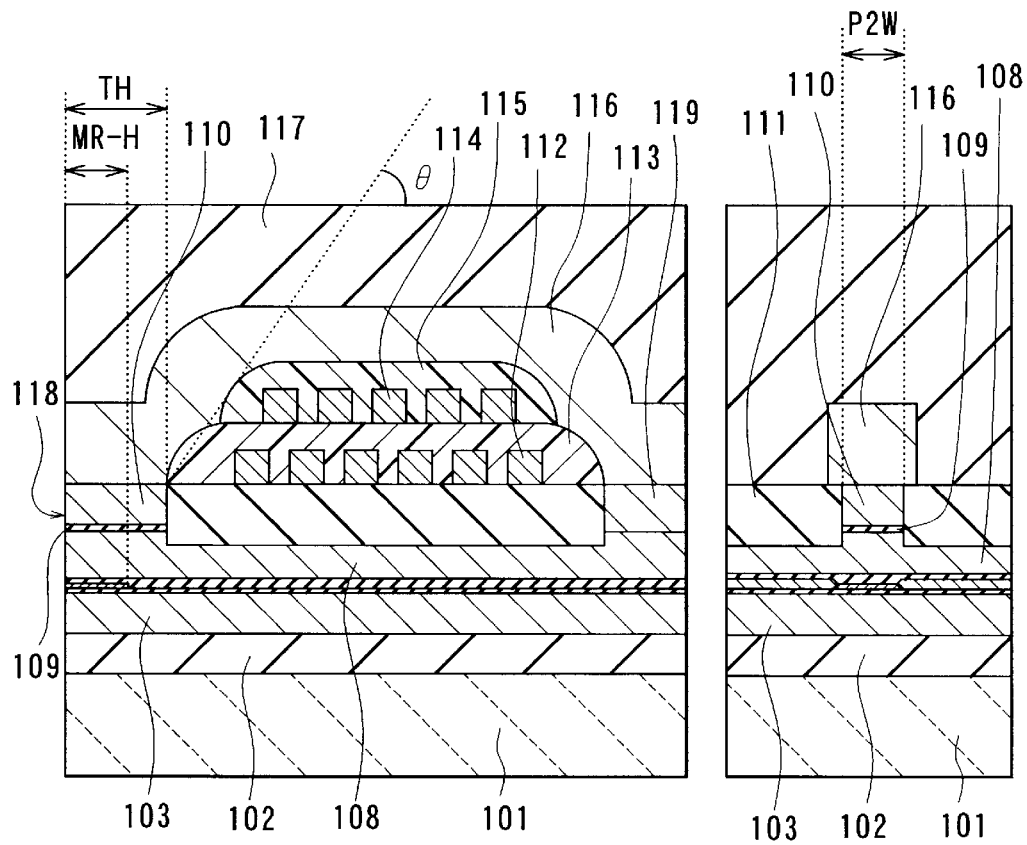
FIG. 15A and FIG. 15B are cross sections for illustrating a step that follows FIG. 14A and FIG. 14B.
Figure 16:
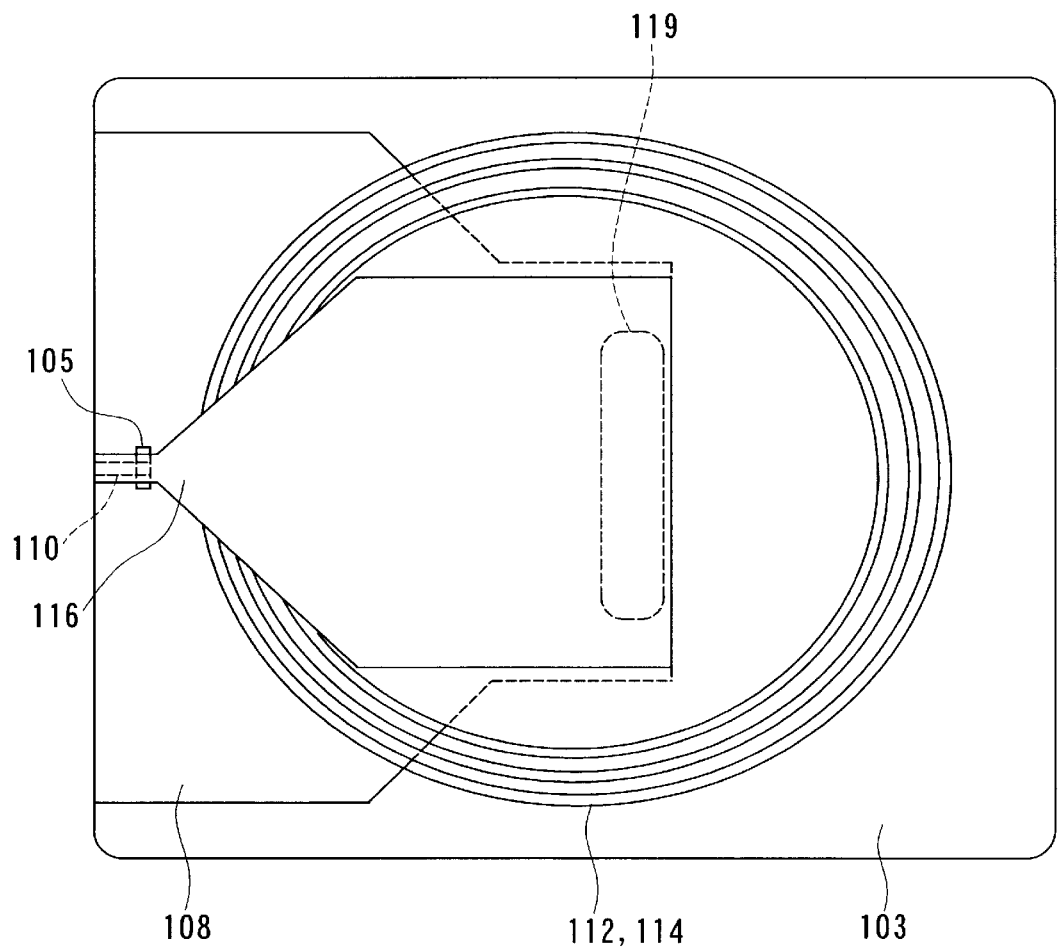
FIG. 16 is a top view of the related-art thin-film magnetic head.

FIG. 11 is a partially-cutaway perspective view of the part of the head shown in FIG. 10 to which the recording gap layer 12 and the top pole layer 13 are added.

Figure 2:
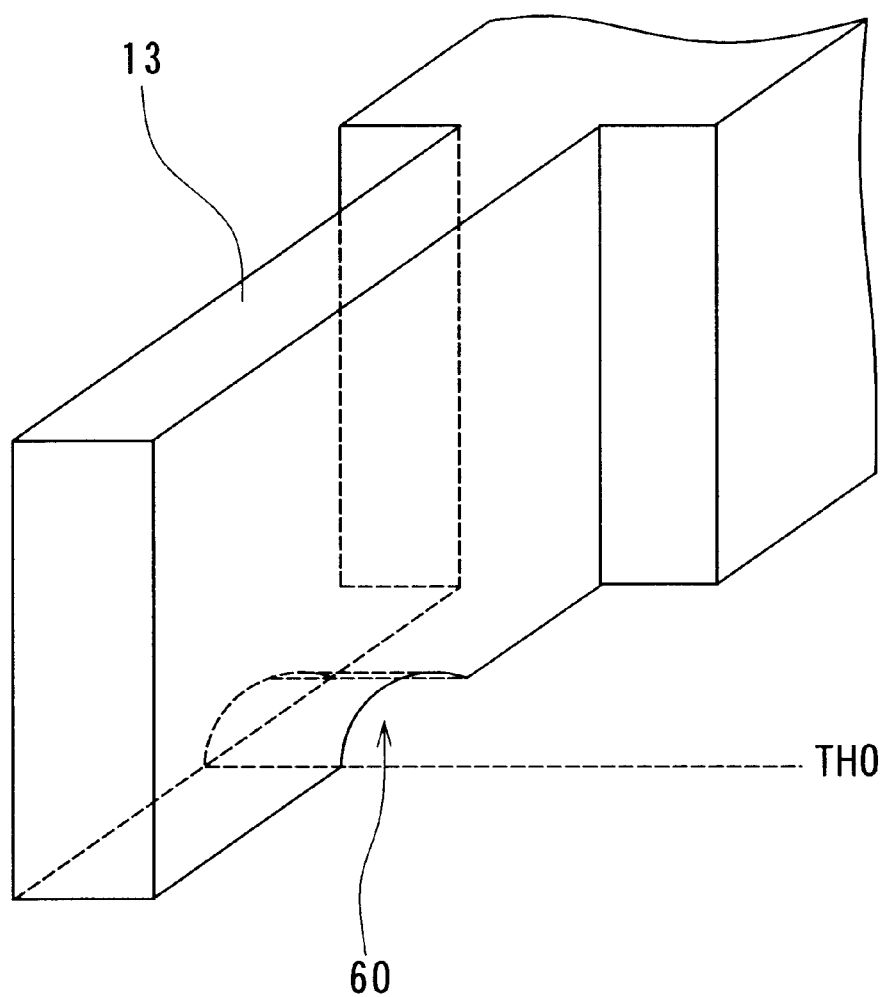
FIG. 2 is a perspective view for illustrating the method of forming the top pole layer and the cavity of the thin-film magnetic head of the embodiment.

Reference is now made to FIG. 1 and FIG. 2 to describe the method of making the top pole layer 13 and the cavity 60 of the embodiment in detail.

In this method, as shown in FIG. 1, a seed layer (electrode film) 51 for plating is formed on the recording gap layer 12.

Next, a positive resist layer is formed on the seed layer 51. This resist layer is then exposed through the use of a photomask 52. The photomask 52 includes: a light shielding region 52a corresponding to the shape of the resist frame for making the top pole layer 13 by frame plating; and a region 52b corresponding to the cavity 60 and located in a position corresponding to the cavity 60, the region 52b intercepting at least part of rays of light used for exposure. The photomask 52 further includes a region 52c through which light passes, the region 52c being located in the region except the regions 52a and 52b. The region 52b may intercept the rays of light for exposure completely, or may intercept part of the rays of light and allow the rest to pass through the region 52b (that is, the permeability is 80 percent, for example).

After the resist layer is exposed through the use of the photomask 52, the resist layer is developed to form the resist frame 53 on the seed layer 51 and to form a resist remaining portion 55 in a region on the seed layer 51 corresponding to the cavity 60 at the bottom of a trench 54 of the resist frame 53. Since at least part of rays of light for exposure is intercepted by the region 52b of the photomask 52, part of the resist unexposed remains. The resist remaining portion 55 is thereby formed.

The resist remaining portion 55 is formed such that an end thereof closer to the air bearing surface is located at zero throat height position THO. The resist remaining portion 55 may have a length of 0.3 to 3 µm orthogonal to the air bearing surface, and a height of 0.1 to 1 µm.

Next, as shown in FIG. 2, the top pole layer 13 is formed by frame plating through the use of the resist frame 53. In this case, the seed layer does not extend over the resist remaining portion 55. However, the plating film for making the top pole layer 13 is greater than the height of the resist remaining portion 55, and greater than the half of the length of the portion 55 orthogonal to the air bearing surface. Consequently, the plating layer hangs over the portion 55, so that the plating layer extends over the portion 55, too. The top pole layer 13 that continues from the front of the portion 55 to the back thereof is thereby obtained.

Next, the resist frame 53 and the resist remaining portion 55, and the seed layer 51 below the frame 53 and the portion 55 are removed to form the cavity 60. If the seed layer 51 is removed by wet etching, it is possible to remove the seed layer 51 without leaving a portion of the seed layer 51 below the cavity 60. If the seed layer 51 is removed by dry etching, a portion of the seed layer 51 may be left below the cavity 60. However, this has little effect on the electromagnetic transducing characteristics.

As described so far, the thin-film magnetic head of the embodiment comprises the medium facing surface that faces toward a recording medium (the air bearing surface 30), the reproducing head and the recording head. The reproducing head has: the MR element 5; and the bottom shield layer 3 and the top shield layer (bottom pole layer 8) for shielding the MR element 5. Portions of the bottom shield layer 3 and the top shield layer on a side of the air bearing surface 30 are opposed to each other, the MR element 5 being placed between these portions.

The recording head has the bottom pole layer 8 (including the first portion 8a, the second portion 8b, and the third portion 8c) and the top pole layer 13 magnetically coupled to each other, each of which includes at least one layer. The bottom pole layer 8 and the top pole layer 13 include pole portions opposed to each other and placed in regions on a side of the air bearing surface 30. The recording head further has: the recording gap layer 12 placed between the pole portion of the bottom pole layer 8 and the pole portion of the top pole layer 13; and the thin-film coil 10 at least a part of which is placed between the bottom pole layer 8 and the top pole layer 13, the at least part of the coil 10 being insulated from the bottom pole layer 8 and the top pole layer 13.

In this embodiment the bottom pole layer 8 has the first portion 8a and the second portion 8b. The first portion 8a is located to face at least a part of the thin-film coil 10. The second portion 8b is connected to a surface of the first portion 8a facing toward the coil 10 (that is, the upper side of FIG. 8A) and includes the pole portion. The coil 10 is located on a side of the second portion 8b (on the right side of FIG. 8A).

In this embodiment the top pole layer 13 is formed on the flat top surface of the recording gap layer 12. The top pole layer 13 is shaped such that a portion thereof forms the cavity 60 with the gap layer 12, the cavity being located in a position at a specific distance from the air bearing surface 30. The throat height is defined by an end of the cavity 60 closer to the air bearing surface 30.

According to the embodiment, the thin-film coil 10 is located on the first portion 8a and on a side of the second portion 8b of the bottom pole layer 8. In addition, the top surface of the insulating layer 11 covering the coil 10 is flattened, together with the top surface of the second portion 8b. As a result, it is possible to form the top pole layer 13 on the flat surface, the top pole layer 13 including the first portion 13A that defines the recording track width. It is thereby possible to form the top pole layer 13 with accuracy even if the recording track width is reduced down to the half-micron or quarter-micron order. Precise control of the recording track width is thereby achieved.

According to the embodiment, the cavity 60 is formed between the top pole layer 13 and the recording gap layer 12. The throat height is defined by the end of the cavity 60 closer to the air bearing surface 30. As a result, the magnetic flux passing through the top pole layer 13 toward the recording gap layer 12 is narrowed at the cavity 60, and then goes toward the gap layer 12. It is thereby possible that the flow of flux passing through the top pole layer 13 toward the gap layer 12 is smoothly changed near the end of the cavity 60 closer to the air bearing surface 30, that is, near zero throat height position THO. It is therefore possible to improve the electromagnetic transducing characteristics such as the overwrite property and NLTS.

According to the embodiment, the interface between the cavity 60 and the top pole layer 13 forms a curved surface. It is thereby possible to change the flow of flux more smoothly.

According to the embodiment, the end of the cavity 60 closer to the air bearing surface 30 is located closer to the air bearing surface 30 than an end of the second portion 8b of the bottom pole layer 8 opposite to the air bearing surface 30. It is thereby possible to prevent an abrupt increase in the space between the second portion 8b and the top pole layer 13, the space being located farther from the sir bearing surface 30 than the position of the end of the cavity 60 closer to the air bearing surface 30, that is, zero throat height position THO. It is thereby possible to improve the electromagnetic transducing characteristics. It is preferred that the cavity 60 is located across an end of the second portion 8b of the bottom pole layer 8 farther from the air bearing surface 30 in order to improve the electromagnetic transducing characteristics.

According to the embodiment, the top pole layer 13 is formed by frame plating. At the same time, the resist remaining portion 55 is formed, through the use of which the cavity 60 is formed. It is therefore easy to form the cavity 60.

According to the embodiment, the thin-film coil 10 is located on a side of the second portion 8b of the bottom pole layer 8 and formed on the flat insulating film 9. It is thereby possible to form the coil 10 of small dimensions with accuracy. Furthermore, it is possible to place an end of the coil 10 near an end of the second portion 8b farther from the air bearing surface 30 since no apex exists. A reduction in the yoke length is thereby achieved.

According to the embodiment, it is possible that the entire length of the coil 10 is greatly reduced without changing the number of turns of the coil 10 since a reduction in the yoke length is achieved. It is thereby possible to reduce the resistance of the coil 10 and to reduce the thickness thereof.

According to the embodiment, the insulating film 9 is provided between the first portion 8a of the bottom pole layer 8 and the thin-film coil 10. The insulating film 9 is thin and made of an inorganic material that achieves sufficient insulation strength. High insulation strength is thereby obtained between the first portion 8a and the coil 10.

In the embodiment the thin-film coil 10 is covered with the insulating layer 11 made of an inorganic insulation material. It is thereby possible to prevent the pole portions from protruding toward a recording medium due to expansion resulting from heat generated around the coil 10 when the thin-film magnetic head is used.

The present invention is not limited to the foregoing embodiment but may be practiced in still other ways. For example, although the top pole layer 13 is made up of a single layer in the foregoing embodiment, it may be made up of a plurality of layers. In this case, the layer including the pole portion corresponds to the throat height defining layer of the invention.

In the foregoing embodiment, the thin-film magnetic head is disclosed, comprising the MR element for reading formed on the base body and the induction-type electromagnetic transducer for writing stacked on the MR element. Alternatively, the MR element may be stacked on the electromagnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiment as a bottom pole layer on the base body, and forming a magnetic film functioning as the bottom pole layer of the embodiment as a top pole layer facing the bottom pole layer with the recording gap film in between. In this case it is preferred that the top pole layer of the induction-type electromagnetic transducer functions as the bottom shield layer of the MR element, too.

The invention may be applied to a thin-film magnetic head dedicated to writing that has an induction-type electromagnetic transducer only or to a thin-film magnetic head performing writing and reading through an induction-type electromagnetic transducer.

According to the thin-film magnetic head or the method of manufacturing the same of the invention described so far, the throat height defining layer is formed to touch the flat surface including the gap layer. As a result, it is possible to form the pole portions with accuracy. In addition, the throat height is defined by an end of the cavity closer to the medium facing surface, the cavity being formed in a portion between the throat height defining layer and the gap layer. It is thereby possible that the flow of flux passing through the throat height defining layer toward the gap layer is smoothly changed near the end of the cavity closer to the medium facing surface. It is therefore possible to improve the electromagnetic transducing characteristics.

According to the thin-film magnetic head or the method of manufacturing the same of the invention, the interface between the cavity and the throat height defining layer may form a curved surface. It is thereby possible to change the flow of flux more smoothly.

According to the head or the method of the invention, the following configuration is possible. The first magnetic layer includes: the first portion located to face at least a part of the thin-film coil; and the second portion including the pole portion and connected to a surface of the first portion facing toward the coil. The at least part of the coil is located on a side of the second portion of the first magnetic layer. An end of the cavity closer to the medium facing surface is located closer to the medium facing surface than an end of the second portion of the first magnetic layer opposite to the medium facing surface. Such a configuration prevents an abrupt increase in the space between the first and second magnetic layers, the space being located farther from the medium facing surface than the position of the end of the cavity closer to the medium facing surface. It is thereby possible to improve the electromagnetic transducing characteristics.

According to the head or the method of the invention, the throat height defining layer may include the portion for defining the track width. It is thereby possible to control the track width with accuracy.

According to the head or the method of the invention, the cavity may be formed through the use of the resist remaining portion. It is therefore easy to form the cavity.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:

a medium facing surface that faces toward a recording medium;

a first magnetic layer and a second magnetic layer magnetically coupled to each other and including magnetic pole portions opposed to each other and placed in regions of the magnetic layers on a side of the medium facing surface, each of the magnetic layers including at least one layer;

a gap layer provided between the pole portions of the first and second magnetic layers, the gap layer having a flat first surface that touches the pole portion of the first magnetic layer, and a flat second surface that touches the pole portion of the second magnetic layer; and a thin-film coil at least a part of which is placed between the first and second magnetic layers, the at least part of the coil being insulated from the first and second magnetic layers; wherein the second magnetic layer includes a throat height defining layer touching a flat surface including the second surface of the gap layer, the throat height defining layer being formed such that a portion thereof forms a cavity with the gap layer, the cavity being located in a position at a specific distance from the medium facing surface, the throat height defining layer touching the second surface of the gap layer at a portion of the throat height defining layer located closer to the medium facing surface than an end of the cavity closer to the medium facing surface and at a portion of the throat height defining layer located farther from the medium facing surface than the other end of the cavity farther from the medium facing surface, the throat height being defined by the end of the cavity closer to the medium facing surface.

2. The thin-film magnetic head according to claim 1 wherein the interface between the cavity and the throat height defining layer forms a curved surface.

3. The thin-film magnetic head according to claim 1 wherein:

the first magnetic layer includes: a first portion located to face the at least part of the thin-film coil; and a second portion including one of the pole portions and connected to a surface of the first portion facing toward the coil; and the at least part of the coil is located on a side of the second portion of the first magnetic layer.

4. The thin-film magnetic head according to claim 3, further comprising an insulating layer that covers the at least part of the coil located on the side of the second portion of the first magnetic layer, and has a surface facing toward the gap layer, the surface being flattened together with a surface of the second portion of the first magnetic layer facing toward the gap layer.

5. The thin-film magnetic head according to claim 3 wherein the end of the cavity closer to the medium facing surface is located closer to the medium facing surface than an end of the second portion of the first magnetic layer opposite to the medium facing surface.

6. The thin-film magnetic head according to claim 1 wherein the throat height defining layer includes a portion for defining a track width.

* * * * *